Oct. 4, 1955  J. R. BRINKLEY  2,719,524
SEED SCREEN ATTACHMENT FOR STRAW-WALKERS
OF A COMBINED HARVESTER
Filed Nov. 17, 1952  2 Sheets-Sheet 1
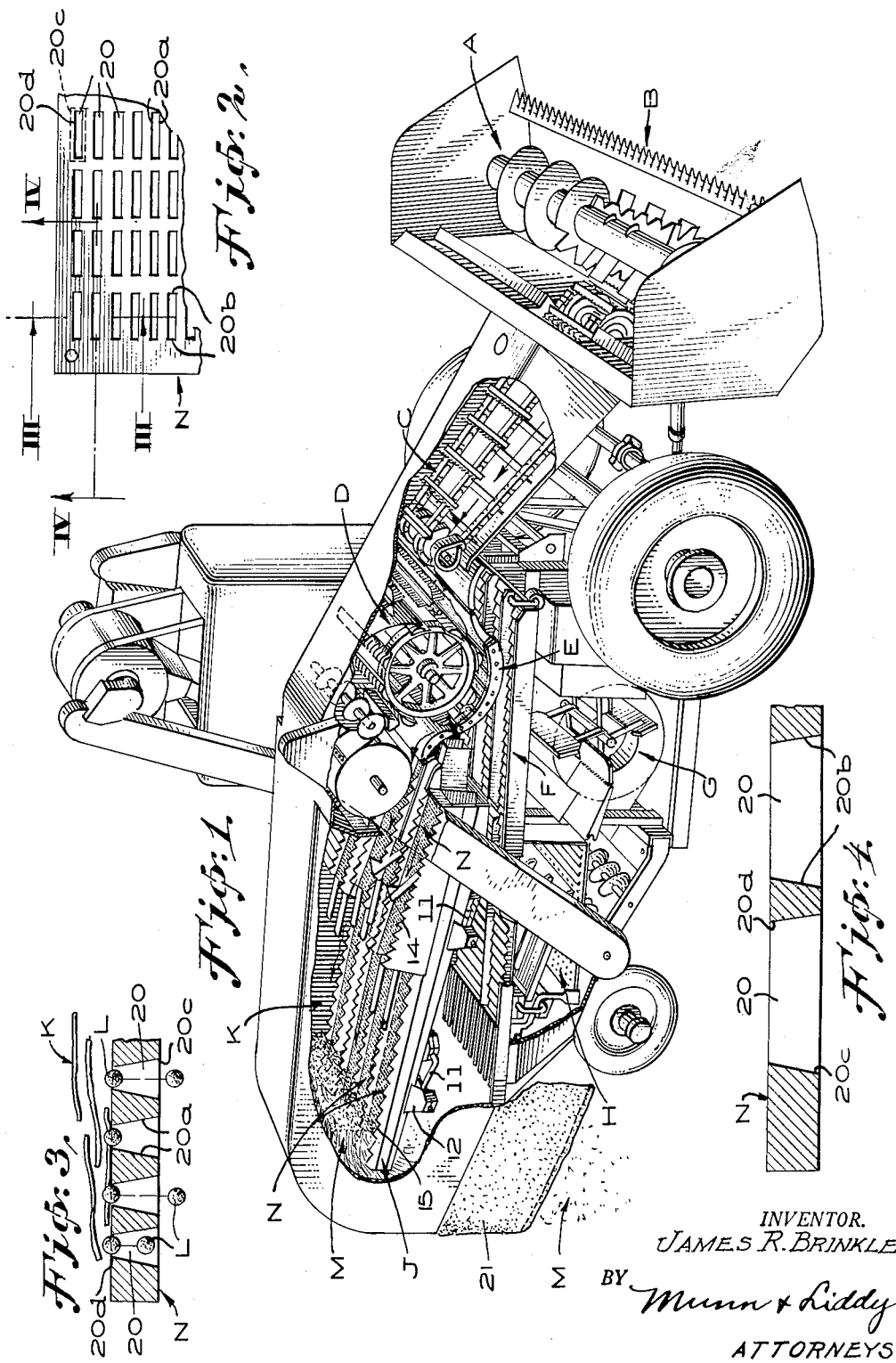
INVENTOR.
JAMES R. BRINKLEY
BY Munn + Liddy
ATTORNEYS

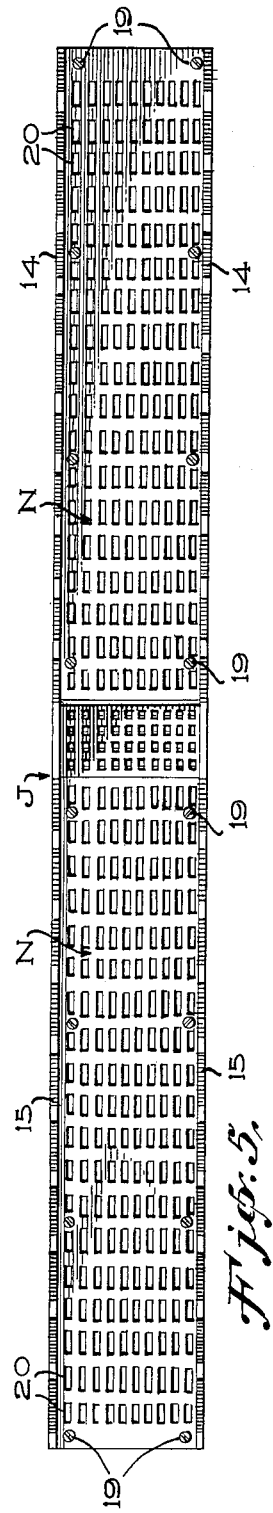
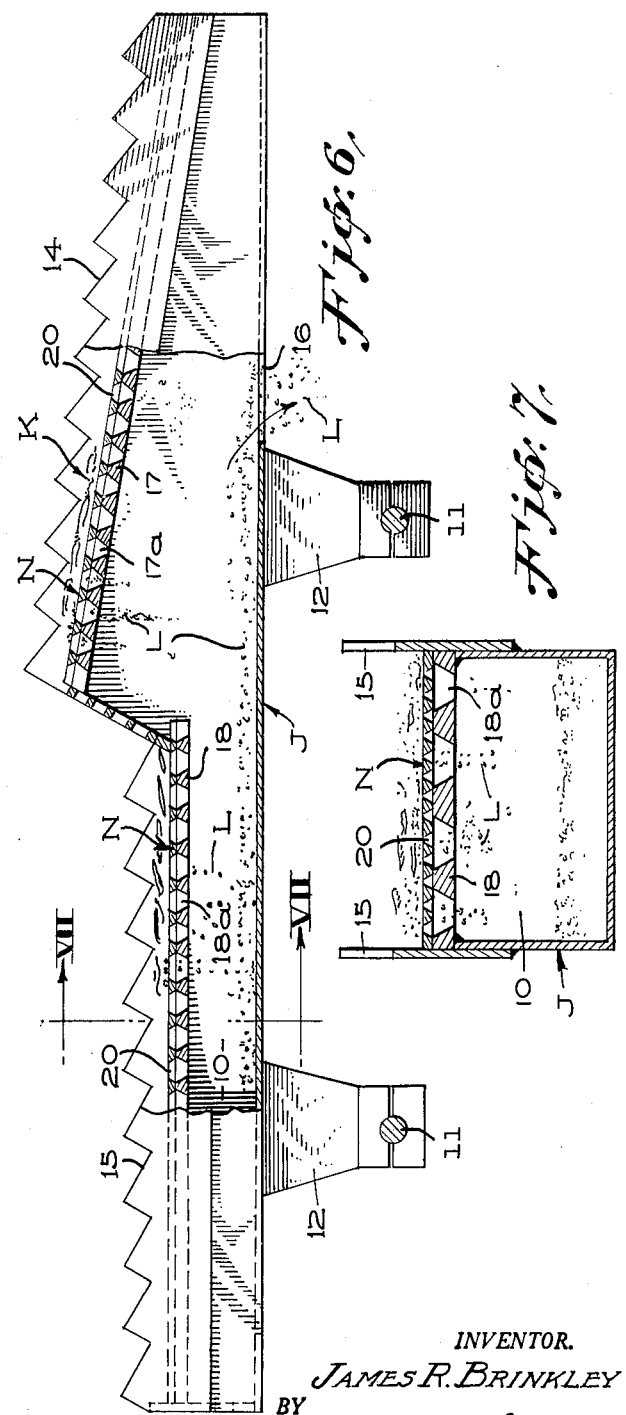

United States Patent Office 2,719,524
Patented Oct. 4, 1955

2,719,524

SEED SCREEN ATTACHMENT FOR STRAW-WALKERS OF A COMBINED HARVESTER

James R. Brinkley, Elk Grove, Calif.

Application November 17, 1952, Serial No. 320,911

2 Claims. (Cl. 130—26)

The present invention relates to a seed screen attachment for straw-walkers of a combined harvester, which is especially designed for separating relatively fine seed, such as Ladino clover and alfalfa from the straw and chaff, thereby increasing the amount of seed recovered.

At the present time, there is no commercial harvester on the market, insofar as I am aware, that is made for handling such small type of seeds. However, combined harvesters have been produced for many years for separating and cleaning larger seeds, such as grain.

Accordingly, a cardinal object of this invention is to provide an attachment, which may be installed readily in a conventional grain-type combined harvester, allowing the latter to be utilized for separating the finer clover and alfalfa seed from straw and chaff.

More specifically described, it is proposed to add a perforated screen to the channel of a straw-walker in a combined harvester, thus securing the objective of recovering a high percentage of finer seeds during the harvesting thereof.

Other objects and advantages will appear as the specification continues. The novel features will be set forth in the claims hereunto appended.

*Drawings*

For a better understanding of the invention, reference should be had to the accompanying drawings, forming part of this application, in which:

Figure 1 is a perspective view of a combined harvester, in which the straw-walkers have been provided with my perforated screen attachments;

Figure 2 is a fragmentary plan view of a portion of the screen that I employ;

Figures 3 and 4 are enlarged transverse and longitudinal sectional views taken along the lines III—III and IV—IV, respectively, of Figure 2;

Figure 5 is a top plan view of one of the straw-walkers having my screen attachment added thereto;

Figure 6 is a side elevational view of Figure 5, with parts being shown in section; and Figure 7 is a vertical transverse sectional view taken along the line VII—VII of Figure 6.

While I have shown only the preferred form of my invention, it should be understood that various changes, or modifications, may be made within the scope of the annexed claims, without departing from the spirit thereof.

*Detailed description*

Referring now to Figure 1, a combined harvester has been disclosed therein as having a rotatable auger A arranged to transfer forage from a cutter-bar B to an upwardly-inclined conveyor C. This forage, which may be grain, clover, alfalfa, or the like, is subjected to the action of a rasp-bar cylinder D while passing over a concave plate E, and accounting for the majority of separation of the seed from the forage. The seed thus dislodged falls onto a grain pan F.

Moreover, a fan G provides an air blast passing through the cleaning zone H. This harvester further provides a plurality of straw-walkers J, which vigorously shake the straw K so that any remaining seeds L will fall upon the grain pan for recovery. These straw-walkers toss the straw, allowing the seeds to gravitate into the lower channels 10 thereof (see Figures 6 and 7).

For the purpose of reciprocating the straw-walkers, and at the same time undulate them up and down, rotating cranks 11—11 are connected thereto by brackets 12—12 in which the offset portions of the cranks are journalled. In many combined threshers the straw-walkers have upper and lower sets of serrated side edges 14—14 and 15—15, respectively, bordering the channels 10, with the side plates defining a step as shown in Figure 6. The purpose of the walkers is to carry out the chaff M, while diverting the seeds to the grain pan F. In this connection, each walker has a large opening 16 through which the seeds descend (see Figure 6).

These conventional straw-walkers are provided with upper and lower grills 17 and 18, respectively, which are set below the serrated edges 14—14 and 15—15, in the manner shown in Figure 6. However, the openings 17a and 18a in these grills, respectively, are so large that considerable chaff will fall therethrough and enter the cleaning zone H.

The openings 17a and 18a in the grills taper downwardly from the upper surface to the lower surface of the grills and are wider at the upper surface than at the lower surface.

All of the foregoing structure is common practice in combined harvesters, and has been set forth somewhat in detail in order to give a clear understanding of the problem confronting growers of Ladino clover, alfalfa and other relatively small seed.

The harvester just described is intended for threshing larger seed, such as grain. Now it is highly desirable to employ this same harvester on the small seed of the clover and alfalfa variety, especially from an economical viewpoint, thus providing a multi-purpose machine.

Accordingly, I make use of perforated screen attachments N, which are added to the channels of the straw-walkers immediately above the grills 17 and 18. These screens may be anchored to the grills by screws 19 (see Figure 5).

During early attempts to solve the problem, experiments were made with various types of screens or wire cloth. However, it was found that they would clog during continued usage.

As a result of many tests during harvesting of Ladino clover seed, and the like, it has been determined that the type of perforated screen attachments N shown in Figures 2 to 7, inclusive, is exceptionally well adapted to solving the problem. Such screens have elongated slots 20 fashioned therein, with the longer dimensions of these slots extending lengthwise relative to the screens (see Figures 2 and 5).

Particular attention is called to the fact that the side walls 20a of each slot 20 diverge downwardly relative to one another (see Figure 3), and the same is true of the end walls 20b of each slot (see Figure 4). Therefore, the bottom marginal perimeter 20c of each slot is larger than the upper marginal perimeter 20d thereof (see Figure 2).

The screen is supported on the grill, supporting contact being had along the parallel portions of the grill and the screen formed intermediate the openings in the grill and the screen. A majority of the elongated perforations in the screen are alined with openings in the grills along at least a portion of their length and form spaced passageways with the openings in the grill through which the seed may pass.

By adding the perforated screen attachments N to the straw-walkers, the capacity of the machine is more than doubled; the seed is separated better from the chaff; and a higher percentage of the seed is recovered. It will be realized that the seeds entering into the top of the slots 20 will be assured of passage downwardly, due to the increasing of the slots from their tops 20d towards the bottoms 20c. This will preclude the slots from becoming clogged. The chaff and straw are "walked" out of the discharge spout 21 of the machine.

I claim:

1. In a channel-shaped straw-walker of a harvester, a base and side members extending upwardly from said base forming a channel therewith, a grill extending from one of said side members to the other and supported thereby, said grill having a number of spaced openings formed therein, and extending therethrough from the upper surface to the lower surface and being of a sufficient size for the passage of seeds, a screen supported on said grill, said screen extending from one of said side members to the other and being substantially co-terminus with said grill, said screen having a series of elongated perforations extending laterally therethrough and of a size to permit the passage of seeds, the majority of the perforations in said screen being alined with the openings in said grill along at least a portion of their length and forming therewith spaced passageways for the passage of seeds from above said screen to below said grill, the perforations in said screen tapering from the upper surface to the lower surface of said screen with the openings being wider at the lower surface of said screen than at the upper surface, and the openings in said grill tapering downwardly from the upper surface thereof to the lower surface thereof with the openings being wider on the upper surface of said grill than on the lower surface of said grill.

2. The apparatus of claim 1 in which there are means for removably securing said screen in fixed relation relative to the grill and said screen and said grill are in intimate contact along parallel portions of said grill and said screen formed intermediate said openings.

References Cited in the file of this patent

UNITED STATES PATENTS

| 274,395 | Schneider | Mar. 20, 1883 |
| 379,762 | Butterworth et al. | Mar. 20, 1888 |
| 1,220,232 | Jackson | Mar. 27, 1917 |
| 1,718,385 | Sherwood | June 25, 1929 |

FOREIGN PATENTS

| 19,077/29 | Australia | Feb. 13, 1930 |